(12) United States Patent
Kuribayashi et al.

(10) Patent No.: US 7,800,717 B2
(45) Date of Patent: Sep. 21, 2010

(54) LIQUID CRYSTAL DISPLAY AND ELECTRONIC APPARATUS

(75) Inventors: Mitsuru Kuribayashi, Chino (JP); Kazumi Aruga, Fujimi (JP); Akira Inagaki, Suwa (JP)

(73) Assignee: Seiko Epson Corporation (JP)

( * ) Notice: Subject to any disclaimer, the term of this patent is extended or adjusted under 35 U.S.C. 154(b) by 927 days.

(21) Appl. No.: 11/620,834

(22) Filed: Jan. 8, 2007

(65) Prior Publication Data

US 2007/0195232 A1 Aug. 23, 2007

(30) Foreign Application Priority Data

Feb. 20, 2006 (JP) .............. 2006-042006

(51) Int. Cl.
*G02F 1/1335* (2006.01)
(52) U.S. Cl. ..................................... 349/109
(58) Field of Classification Search ............. 349/109, 349/110, 106
See application file for complete search history.

(56) References Cited

U.S. PATENT DOCUMENTS

| | | | |
|---|---|---|---|
| 6,577,368 B1 | 6/2003 | Yuh et al. | |
| 6,888,604 B2 | 5/2005 | Rho et al. | |
| 6,989,876 B2 | 1/2006 | Song et al. | |
| 7,280,176 B2 | 10/2007 | Yuh et al | |
| 7,626,660 B2 * | 12/2009 | Takizawa et al. | 349/114 |
| 2002/0154257 A1 | 10/2002 | Iijima | |
| 2005/0162600 A1 | 7/2005 | Rho et al. | |
| 2007/0091043 A1 | 4/2007 | Rho et al. | |
| 2007/0146602 A1 | 6/2007 | Yuh et al. | |

FOREIGN PATENT DOCUMENTS

| | | |
|---|---|---|
| JP | 04-355722 | 12/1992 |
| JP | 08-320478 | 12/1996 |
| JP | 2947350 | 7/1999 |
| JP | 2002-323616 | 11/2002 |
| JP | 2003-107447 | 4/2003 |
| JP | 2004-004822 | 1/2004 |
| JP | 2005-189451 | 7/2005 |
| JP | 2005-331841 | 12/2005 |
| JP | 2007-114320 | 5/2007 |
| KR | 1999-0074556 | 10/1999 |
| KR | 2003-0028978 | 4/2003 |

* cited by examiner

*Primary Examiner*—James A Dudek
(74) *Attorney, Agent, or Firm*—Harness, Dickey & Pierce, P.L.C.

(57) ABSTRACT

A liquid crystal display includes a first substrate, a second substrate disposed in a position opposite to the first substrate, a liquid crystal interposed between the first and second substrates, a plurality of color element regions provided on the second substrate, and a light shield formed so as to surround the color element regions. A width of the light shield varying depending on the color element region.

5 Claims, 9 Drawing Sheets

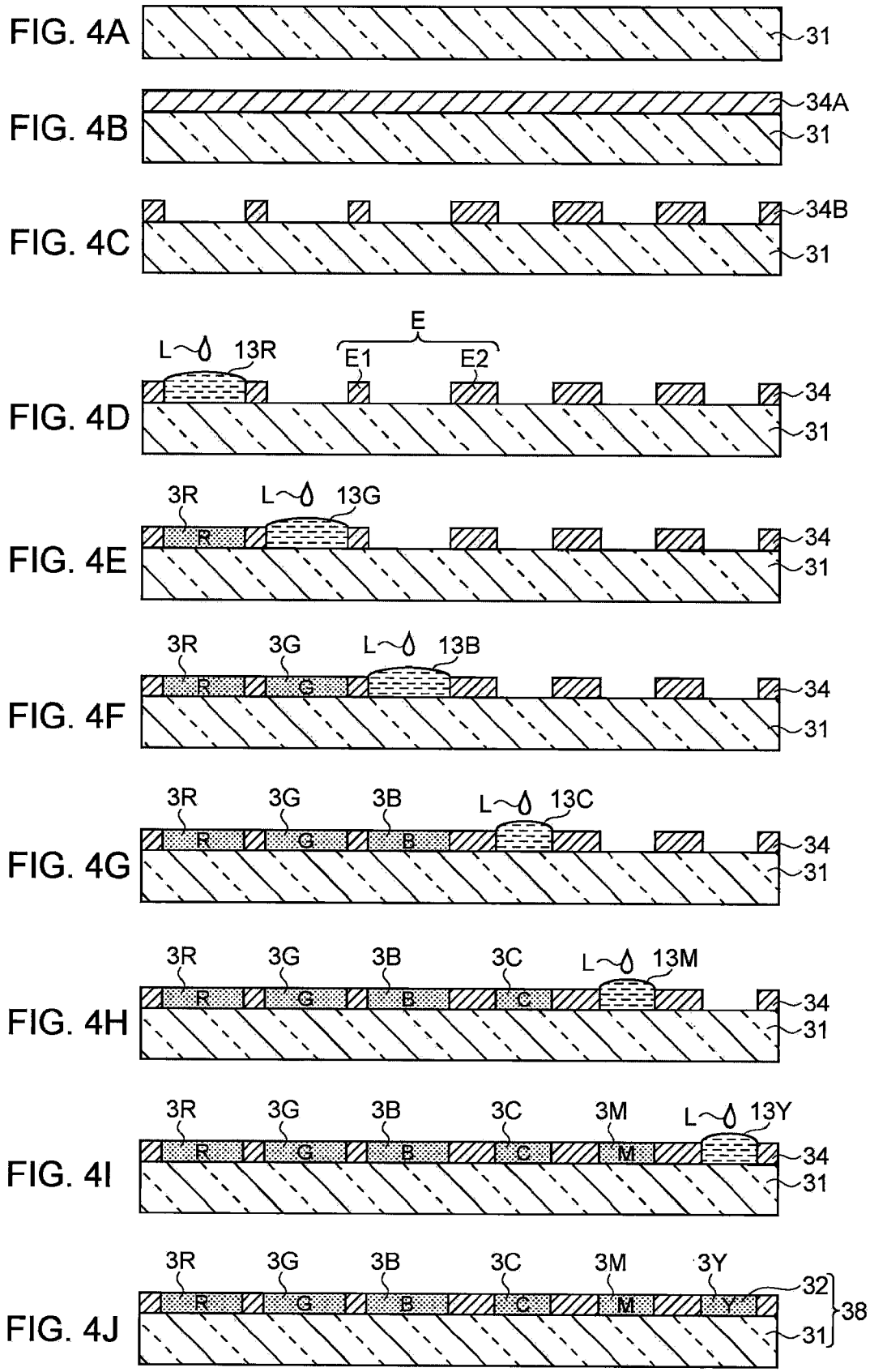

LIQUID CRYSTAL DISPLAY AND ELECTRONIC APPARATUS

BACKGROUND

1. Technical Field

The present invention relates to a liquid crystal display and an electronic apparatus.

2. Related Art

Flat panel displays such as a liquid crystal display (LCD) and a plasma display have widely been used as a display for a television set in recent years. Among these displays, an LCD has been used in large-scale liquid crystal TVs and the like. The display quality of LCDs has been improved by upsizing LCDs, enhancing the definition, and improving the visibility.

As disclosed in Japanese Patent No. 2947350, for example, the viewing angle of LCDs, which has been a shortcoming of LCDs due to its narrowness, has been made wider thanks to development of a VA (Vertically Aligned) type LCD and the like. In VA type LCDs, how liquid crystal molecules fall is controlled by forming a plurality of regions (called "multi-domain") with different orientations in a pixel, thereby achieving a wider viewing angle. On the other hand, as disclosed in JP-A-2005-189451, a method in which occurrence of an air bubble is suppressed has been used in the manufacturing process of a multi-color filter of an active matrix LCD. This has allowed the display quality of LCDs to be improved.

However, in the VA type LCD as shown in Japanese Patent No. 2947350, a protrusion is disposed in a color element region to control how liquid crystal molecules fall. As a result, light transmitted through a liquid crystal is partially shielded. On the other hand, the LCD as shown in JP-A-2005-189451 can be expected to have improved display quality owing to its inclusion of a multi-color filter, but has had a difficulty with achieving a wider viewing angle due to its not being of the VA type. Typically, three color elements—R (red), G (green), and blue (B)—are disposed in a color filter used in an LCD. Besides, the number of color elements to be disposed may be increased, for example, six color elements—R (red), G (green), blue (B), M (magenta), Y (yellow), and C (cyan)—may be disposed. A color filter in which the six colors are disposed, as mentioned above, can achieve more detailed color reproduction than a color filter in which the three colors are disposed (color reproducibility). However, on the other hand, such six color filters caused a reduction in the contrast to a degree that the numbers of color elements are increased.

SUMMARY

An advantage of the invention is to provide an LCD that can suppress a reduction in the contrast while maintaining the color reproducibility, and thus offer excellent visibility as well as excellent display performance, by making a difference between the widths of light shields surrounding color element regions even when the number of color elements of a color filter is increased.

According to an aspect of the invention, an LCD includes a first substrate, a second substrate disposed in a position opposite to the first substrate, a liquid crystal interposed between the first and second substrates, a plurality of color element regions provided on the second substrate, a light shield formed so as to surround the color element regions, and a width of the light shield varying depending on the color element region.

In the LCD thus configured, when light is transmitted the liquid crystal the intensity of the light can be adjusted with good balance to improve the color balance for each color element region. This allows an LCD with excellent visibility to be provided.

In the LCD according to the aspect of the invention, it is preferable that the color element region include a first color element region and a second color element region having a smaller area than that of the first color element region, the first color element region have a first light shield formed so as to extend in a column direction of the first color element region, the second color element region have a second light shield formed so as to extend in a column direction of the second color element region, and a width of the second light shield be made larger than a width of the first light shield.

In the LCD thus configured, when light, which has been transmitted through the liquid crystal, is transmitted through the second color element region, the light less likely affects the first color element region. This makes it possible to provide an LCD that can suppress a reduction in the contrast while maintaining the color reproducibility, and thus offer excellent visibility as well as excellent display performance.

According to another aspect of the invention, an electronic apparatus having an LCD includes the abovementioned LCD.

The electronic apparatus according to another aspect of the invention includes an LCD with improved color balance and excellent visibility. This makes it possible to provide an electronic apparatus capable of improving display performance.

BRIEF DESCRIPTION OF THE DRAWINGS

The invention will be described with reference to the accompanying drawings, wherein like numbers reference like elements.

FIG. 2A is an enlarged plan view, and FIG. 2B is a cross sectional view taken along line A-A of FIG. 2A.

FIG. 3A is a schematic plan view, and FIG. 3B is a schematic cross sectional view taken along line B-B of FIG. 3A.

FIGS. 4A to 4J are cross sectional views of manufacturing steps of the color filter.

FIG. 6A is a schematic perspective view, and FIG. 6B is a schematic cross sectional view.

DESCRIPTION OF EXEMPLARY EMBODIMENTS

An LCD according to an embodiment of the invention will now be described in details with reference to the accompanying drawings.

Embodiment

The active matrix LCD according to the embodiment will be described. A plurality of protrusions for use with orientation control are disposed in a pixel of the LCD.

Figure 1:
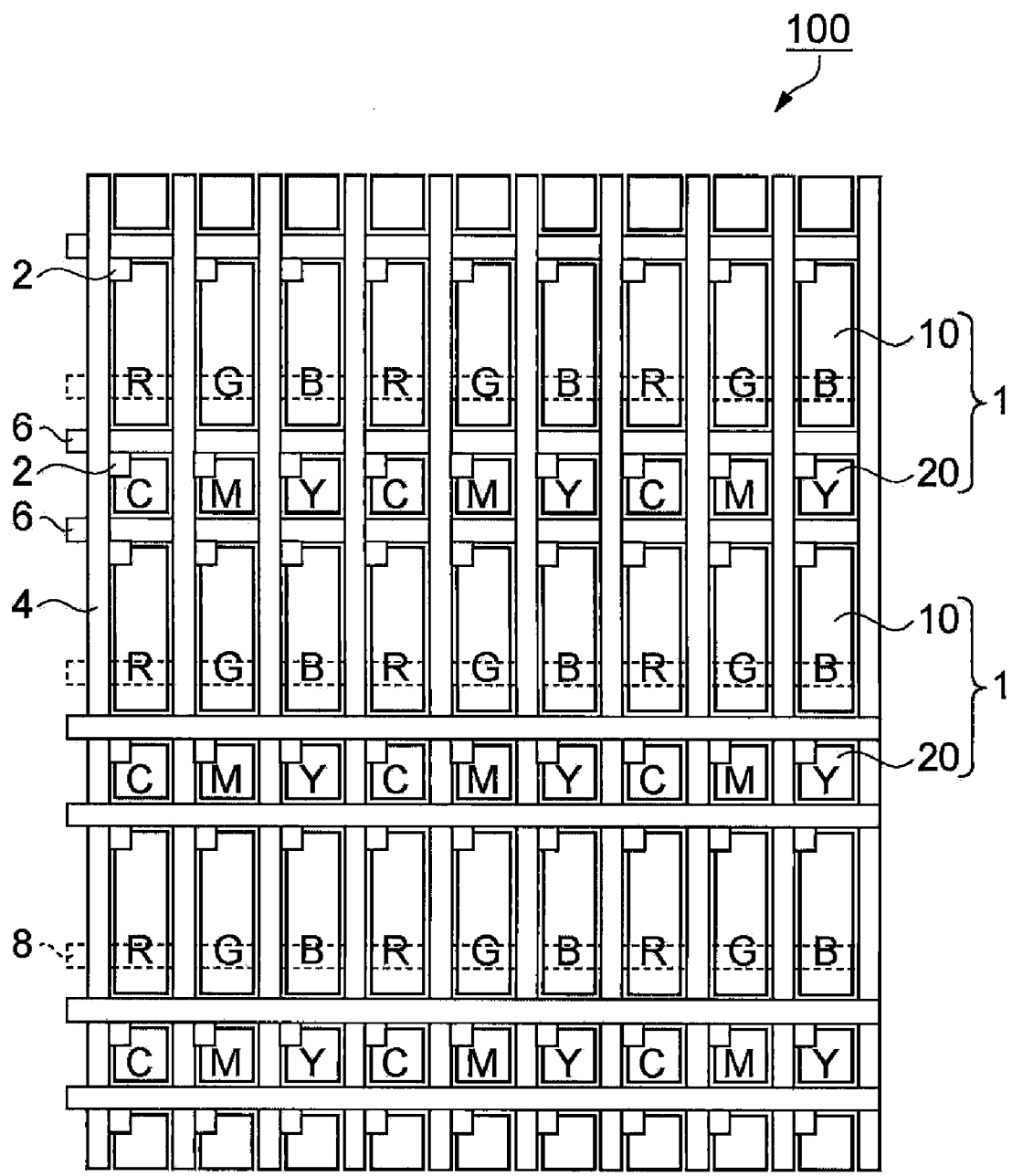
FIG. 1 is a plan view showing an LCD according to an embodiment of the invention.
Figure 2A:
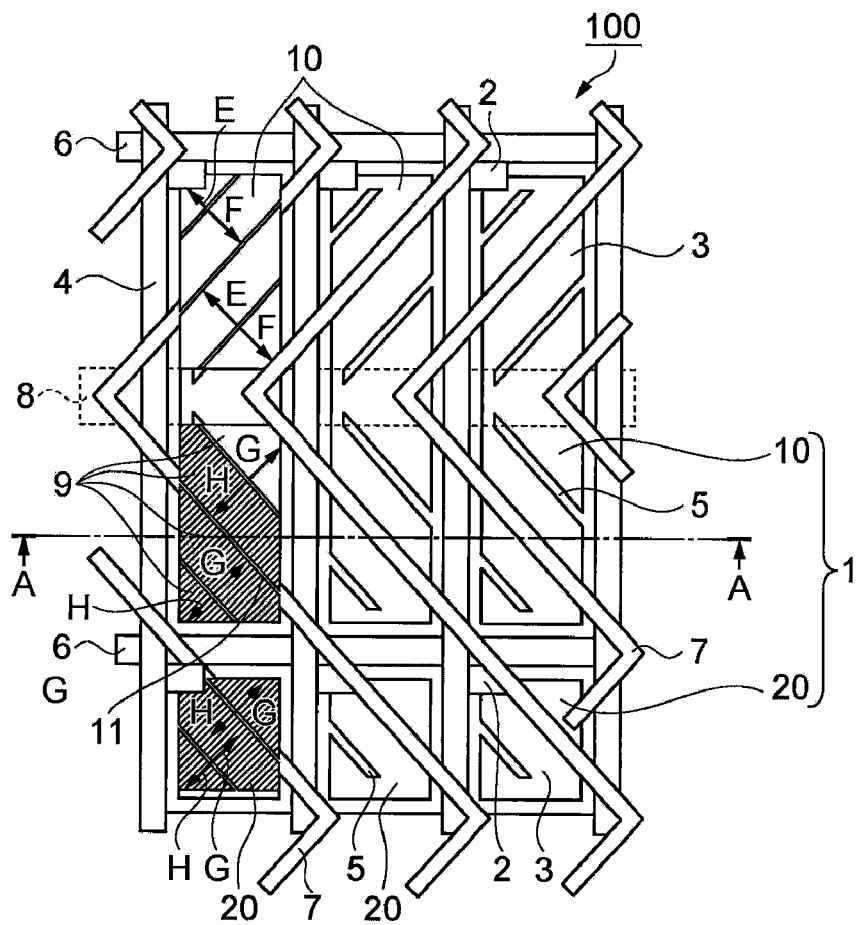
FIGS. 2A and 2B are drawings showing the LCD.
Figure 2B:
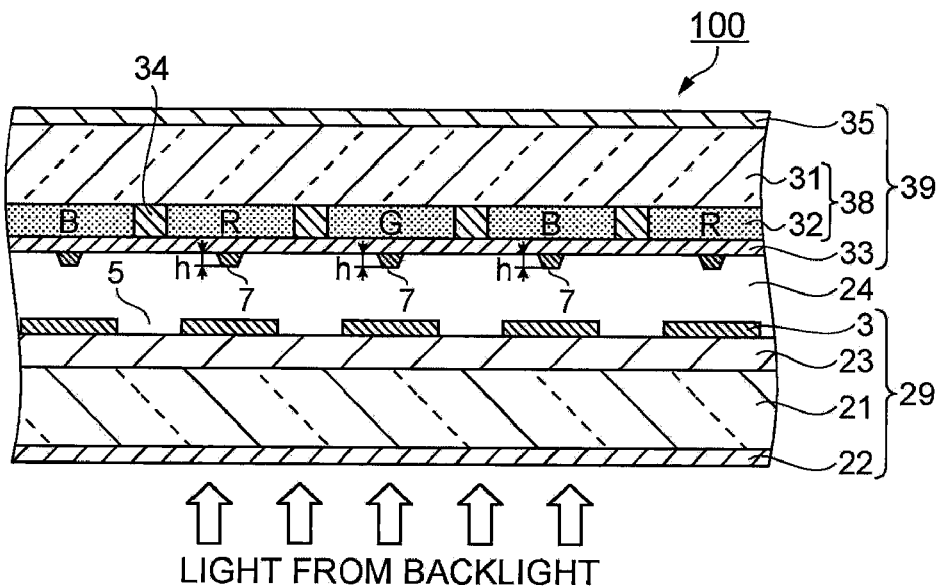

FIG. 1 is a plan view schematically showing the LCD according to the embodiment. FIGS. 2A and 2B are drawings showing the LCD of FIG. 1, FIG. 2A is an enlarged plan view, and FIG. 2B is a cross sectional view taken along line A-A of FIG. 2A.

As shown in FIG. 1, an LCD 100 according to the embodiment schematically consists of a pixel transistor 2, a signal line 4, a gate line 6, a capacity line 8, and a color element region 1. The color element region 1 consists of a pixel 10 serving as a first color element region and a pixel 20 serving as a second color element region. Each pixel 10 (20) is partitioned by the signal line 4 and the gate line 6 formed in a direction approximately perpendicular to the signal line 4, and formed in a rectangular shape. The pixel 10 and the pixel 20 correspond to color elements R, G, B, C, M, and Y (R: red, G: green, B: blue, C: cyan, M: magenta, Y: yellow) formed in a color filter layer 32 (see FIG. 2B). The pixel 20 is formed so as to be smaller in size than the pixel 10. The color elements C, M, and Y of the pixel 20 act as complementary colors to the color elements R, G, and B of the pixel 10. For example, the pixel 20 of the color element C (cyan) is disposed in the vicinity of the pixel 10 of the color element R (red), the pixel 20 of the color element M (magenta) is disposed in the vicinity of the pixel 10 of the color element G (green), and the pixel 20 of the color element Y (yellow) is disposed in the vicinity of the pixel 10 of the color element B (blue).

The pixel transistor 2 is formed in each of the pixel 10 and the pixel 20, and can control a pixel electrode 3 (see FIGS. 2A and 2B) based on a gate signal.

As shown in FIG. 2A, the signal line 4 is electrically connected to the pixel electrode 3, and can apply a supplied video signal to the pixel electrode 3. The gate line 6 is formed so as to be approximately perpendicular to the signal line 4. The capacity line 8 has an identical potential to that of an opposed electrode 33 (see FIG. 2B), and maintains a capacity with the pixel electrode 3. The pixel transistor 2, the signal line 4, the gate line 6, and the capacity line 8 are each formed of a less light-transmissive material such as metal. Therefore, light emitted by a backlight is less likely to be transmitted through those parts.

The color element region 1 of the LCD 100 as shown in FIG. 2A will now be described. The color element region 1 in a right part of FIG. 2A and the color element region in a left part of FIG. 2A will be described separately.

In the right part of FIG. 2A, the pixel electrode 3, a slit 5, and a rib 7 serving as a protrusion are shown in the color element region 1. As shown in the figure, the pixel 10 and the pixel 20 are formed such that the area of the pixel 20 is smaller than that of the pixel 10. The pixel electrode 3 has the slit 5 in the color element region 1 in the right part of FIG. 2A. A color filter forming substrate 31 (see FIG. 2B) has the rib 7 serving as a protrusion thereabove. The slit 5 and the rib 7 can serve to control the falling direction of a liquid crystal molecule when a voltage is applied between the pixel electrode 3 and the opposed electrode 33 (see FIG. 2B).

In the color element region 1 in the left part of FIG. 2A, a domain boundary 11 that partitions the pixel 10 and the pixel 20, and a domain 9 formed by partitioning the pixel 10 and the pixel 20 are shown. As shown in the figure, the pixel 10 in the left part of FIG. 2A is partitioned by the domain boundary 11 to form eight domains 9 (multi-domains), which are shaded portions. Even when a voltage is applied between the pixel electrode 3 and the opposed electrode 33, a liquid crystal molecule is kept in a vertical orientation on the domain boundary 11, which is a boundary between the domains 9. As a result, light is less likely to be transmitted through the domain boundary 11. Similarly, the pixel 20 is partitioned by the domain boundary 11 to form three domains 9 (shaded portions).

In the LCD 100, which is of the VA type, a liquid crystal is in a vertical orientation when no voltage is applied between the pixel electrode 3 and the opposed electrode 33. The pixel 10 and the pixel 20 are partitioned by the domain boundary 11. Therefore, molecules in the pixel 10 fall in four falling directions of E, F, G, and H. As a result, the viewing angle dependence is dispersed in four directions, allowing the viewing angle to be widened. Similarly, in the pixel 20, the viewing angle dependence is dispersed in two directions.

As shown in FIG. 2B, the LCD 100 schematically consists of the element forming substrate 21, the color filter forming substrate 31, and the liquid crystal 24 interposed between the element forming substrate 21 and the color filter forming substrate 31. The LCD 100 is configured such that light emitted by a backlight is transmitted through the liquid crystal 24.

As shown in FIG. 2B, an element forming layer 23, the pixel electrode 3, and the slit 5 are formed on a side of the element forming substrate 21, and an optical film 22 is formed on the other side of the element forming substrate 21.

The element forming substrate 21 is formed of a light-transmissive material such as boric silicic acid glass (index of refraction: 1.52), so light emitted by the backlight is apt to be transmitted through the element forming substrate 21.

The element forming layer 23 includes the pixel transistor 2, the signal line 4, the gate line 6, and the capacity line 8, and is formed of a semiconductor material, a metal material, and an insulating material. The element forming layer 23 is formed on the element forming substrate 21. The pixel electrode 3 is formed of transparent conductive material having a conductive function, such as indium tin oxide (ITO), and formed on the element forming layer 23. Therefore, light is apt to be transmitted through the pixel electrode 3. An orientation film (not shown), which is formed of polyimide or the like and has a vertical orientation function, is formed on the pixel electrode 3.

The optical film 22 is formed of a material capable of polarizing light and thus can polarize light emitted by the backlight.

As shown in FIG. 2B, the color filter layer 32, the opposed electrode 33, a bank 34, and the rib 7 serving as a protrusion are formed on a side of the color filter forming substrate 31. The optical film 35 is formed in the other side of the color filter forming substrate 31.

The color filter forming substrate 31 is formed of a transmissive material such as boric silicic acid glass (index of refraction: 1.52), so light is apt to be transmitted through the color filter forming substrate 31. The color filter layer 32 corresponds to the pixels 10, and is a color filter layer including the color elements R, G, and B and formed of an organic material. The opposed electrode 33 is formed of a transparent conductive material having a conductive function such as indium tin oxide (ITO), and formed on the color filter layer 32. Therefore, light is apt to be transmitted through the opposed electrode 33. An orientation film (not shown), which is formed of polyimide or the like and has a vertical orientation function, is formed on the opposed electrode 33. The bank 34 bounds the color elements R, G, and B and the color elements C, M, and Y (see FIG. 1), which are formed in the color filter layer 32.

The optical film 35 is formed of a material capable of polarizing light and thus can polarize light transmitted through the liquid crystal 24.

The orientation of a liquid crystal molecule in the liquid crystal 24 can be changed by applying a voltage between the pixel electrode 3, formed on the element forming substrate 21, and the opposed electrode 33, formed on the color filter substrate 31.

As shown in FIG. 2B, the rib 7 serving as a protrusion is formed on the color filter layer 32, and disposed for each of the color elements R (red), G (green), and B (blue). Similarly, the rig 7 is disposed (not shown) for each of the color elements C (cyan), M (magenta), and Y (yellow).

A color filter used in the LCD according to the embodiment will now be described.

Figure 3A:
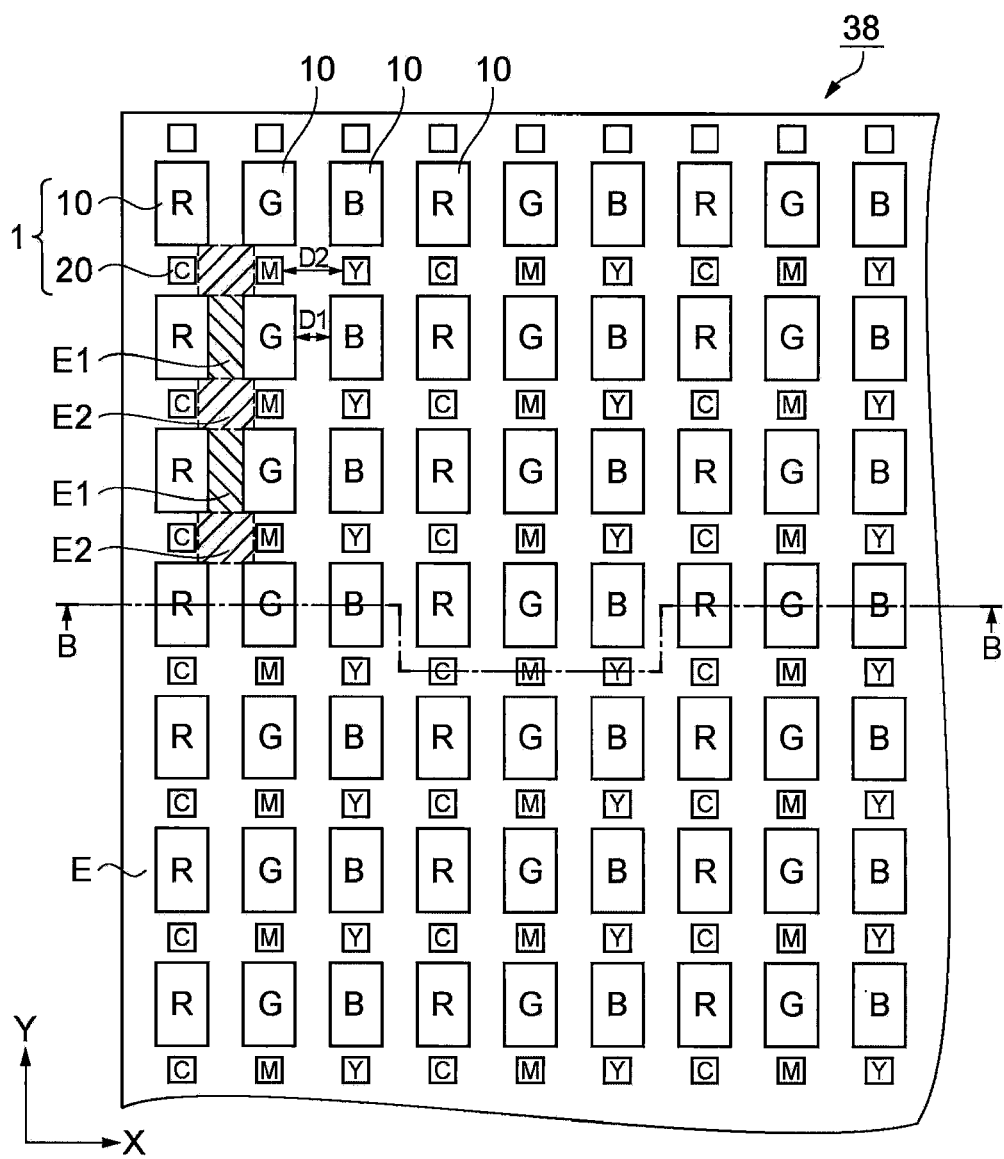
FIGS. 3A and 3B are drawings showing a structure of a color filter.
Figure 3B:
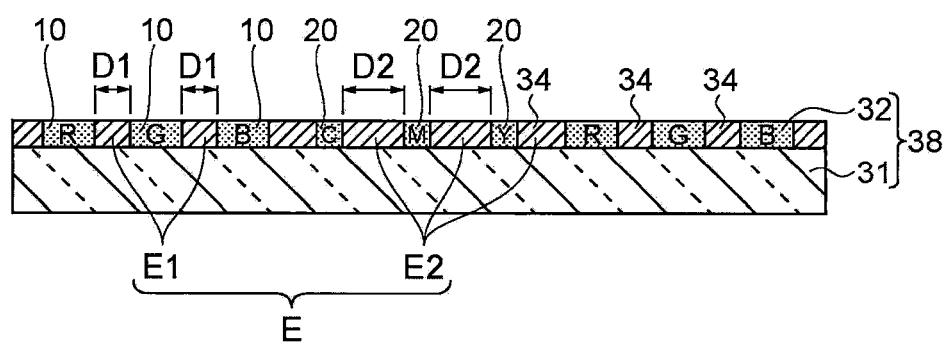

FIGS. 3A and 3B are drawings showing a structure of the color filter, FIG. 3A is a schematic plan view, and FIG. 3B is a schematic cross sectional view taken along line B-B of FIG. 3A.

As shown in FIG. 3A, a color filter 38 has the color element region 1 formed therein. The color element region 1 consists of the pixel 10 serving as a first color element region and the pixel 20 serving as a second color element region, the area of which is smaller than the pixel 10. In the vicinity of the color element region 1, a light shield E is formed so as to surround the color element region 1. A first light shield E1 is formed so as to extend in a column direction (Y direction) of the pixel 10. The first light shield E1 refers to a region between the pixel 10 and the adjacent pixel 10 in an X direction. Therefore, the interval between the pixel 10 and the adjacent pixel 10 is the width D1 of the first light shield E1. Similarly, a second light shield E2 is formed in a column direction (Y direction) of the pixel 20. The second light shield E2 refers to a region between the pixel 20 and the adjacent pixel 20 in an X direction. Therefore, the interval between the pixel 20 and the adjacent pixel 20 is the width D2 of the second light shield E2. The first light shield E1 and the second light shield E2 are formed so that the width D2 of the second light shield E2 is larger than the width D1 of the first light shield E1. The first light shield E1 and the second light shield E2 are connected and make up the light shield E.

As shown in FIG. 3B, the color filter 38 schematically consists of the bank 34, formed on the color filter forming substrate 31, and the color filter layer 32, partitioned by the bank 34. The pixel 10 serving as the first color element region is bounded by the first light shield E1, and the pixel 20 serving as the second color element region is bounded by the second light shield E2. The light shield E, made up of the first light shield E1 and the second light shield E2, is only required to shield against light transmitted through the liquid crystal 24. Therefore, a black matrix or the like serving as a base layer may be formed below the light shield E.

Hereafter a method for manufacturing the color filter according to the embodiment will be described.

Figure 5:
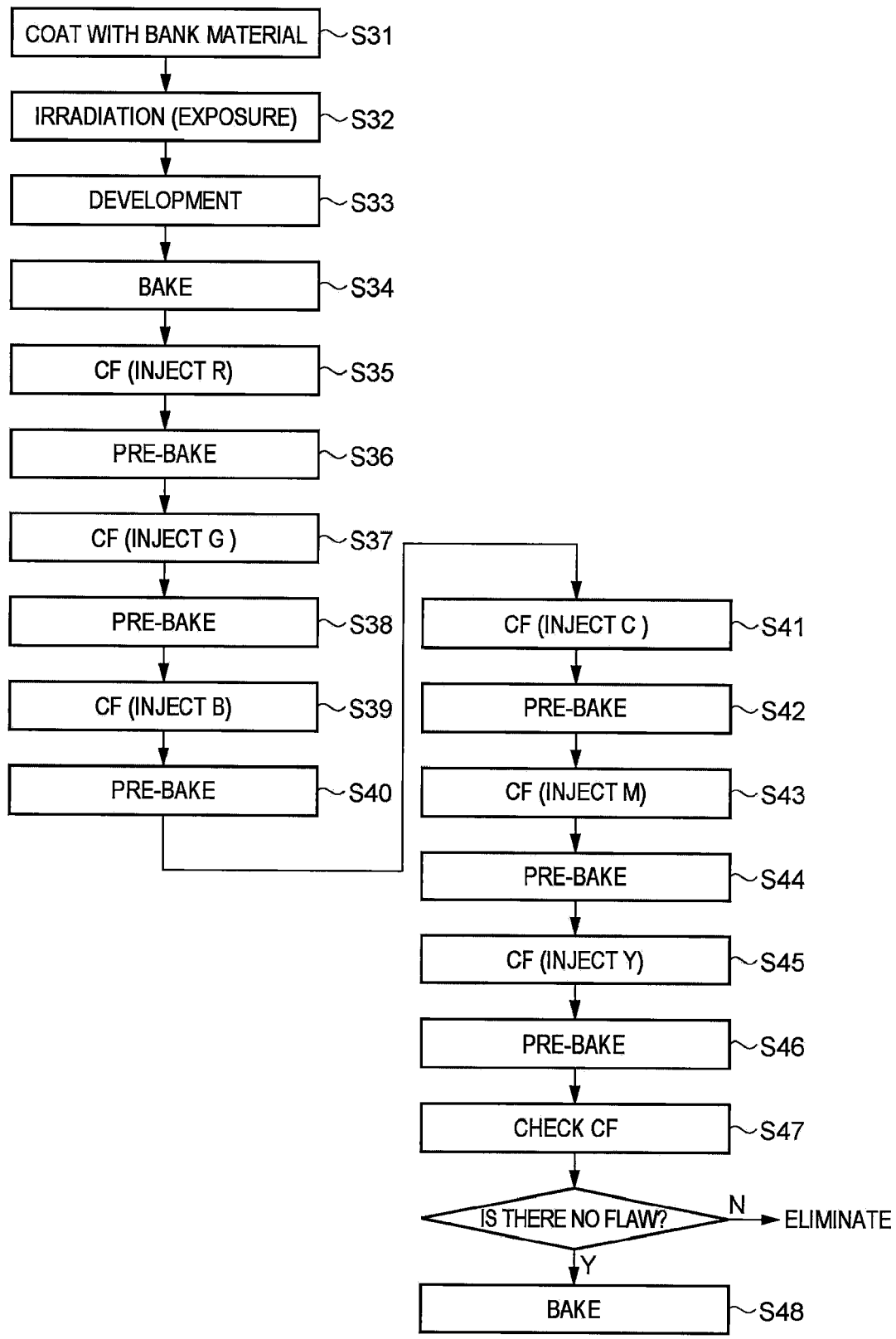
FIG. 5 is a schematic flowchart showing the manufacturing steps of the color filter.

FIGS. 4A to 4J are cross sectional views of manufacturing steps of the color filter. FIG. 5 is a schematic flowchart showing the manufacturing steps of the color filter.

As shown in FIG. 4A and step S31 of FIG. 5, a surface of the color filter forming substrate 31, consisting of a light-transmissive glass material, is coated with a radiation sensitive material 34A by droplet ejection using a droplet ejection apparatus (not shown) (see FIG. 4B). The radiation sensitive material 34A is preferably a resin composition. The thickness of the radiation sensitive material 34A after coating is typically 0.1 to 10 μm, preferably 0.5 to 3.0 μm. The method for coating with the radiation sensitivity material 34A is not limited to droplet ejection. Other manufacturing methods such as spin coating, flow coating, and roll coating, may be used.

As the resin composition that composes the radiation sensitive material 34A, it is possible to use, for example, (i) a radiation sensitive resin composition that contains a binder resin, a polyfunctional monomer, a photo polymerization initiating material, and the like and hardens by application of a radiation ray, or (ii) a radiation sensitive resin composition that contains a binder resin, a compound that generates an acid by application of a radiation ray, a cross-linking compound that can perform cross-linking by a function of an acid generated by application of a radiation ray, or the like and hardens by application of a radiation ray. Typically these resin compositions are mixed with a solvent to prepare a liquid composition. Such a solvent may be either of a high boiling solvent or low boiling solvent. The radiation sensitive material 34A is preferably a composition including (a) a copolymer of hexafluoropropylene, unsaturated carboxylic acid (monomer), and other unsaturated ethylene monomers that can copolymerize with other monomers, (b) a compound that generates an acid by application of a radiation ray, (c) a cross-linking compound that can cross-link by a function of an acid generated by application of a radiation ray, (d) a fluorine organic compound other than the abovementioned (a), and (e) a solvent that can dissolve the abovementioned (a) to (d) ingredients, as described in JP-A-H10-86456.

Then, as shown in FIG. 4B and step S32 of FIG. 5, a radiation ray is applied (exposure is performed) to the radiation sensitive material 34A via a prescribed pattern mask (not shown). Radiation rays generally include a visible ray, an ultraviolet ray, an X-ray, and an electronic ray. In this case, a radiation ray (light) with a wavelength of 190 to 450 nm is preferably used. The pattern mask (not shown) preferably has a shape such that the width of the second light shield E2 is made larger than that of the first light shield E1. Using such a pattern mask allows the pixel 20 serving as the second color element region to be formed with an area smaller than that of the pixel 10 serving as the first color element region.

Then, as shown in FIG. 4C and step 33 of FIG. 5, developing the radiation sensitive material 34A forms a bank 34B. The bank 34B is formed in a shape (negative pattern or positive pattern) corresponding to the abovementioned pattern mask. For example, the bank 34B is preferably formed in a lattice shape that defines square filter element forming regions such that the square filter element forming regions may be arranged in a matrix on a plane. Such development forms the first light shield E1 having the width D1 and the second light shield E2 having the width D2. Using such a the pattern mask allows the first light shield E1 and the second light shield E2 to be formed so that the width D2 of the second light shield E2 is smaller than the width D1 of the first light shield E1. The first light shield E1 is formed so as to extend in a column direction (Y direction) of the pixel 10 serving as the first color element region. Similarly, the second light shield E2 is formed so as to extend in a column direction (Y direction) of the pixel 20 serving as the second color element region. The first and second light shields E1 and E2 both serve to shield against light transmitted through the liquid crystal 24. An alkali developing solution is used as a solution for developing the radiation sensitive material 34A. As such an alkali developing solution, a solution is preferably used, such as sodium carbonate, sodium hydroxide, potassium hydroxide, silicon sodium, meta-silicon sodium, ammonia solution, ethylamine, n-propylamine, diethylamine, di-n-propylamine, triethylamine, methyldiethylamine, dimethylethanolamine, triethanolamine, tetramethylammonium hydroxide, choline, pyrrole, piperidine, 1,8-diazabicyclo[5,4,0]-7-undecene, and 1,5-diazabicyclo[4.3.0]nonene. It is possible to add, for example, a water-soluble organic solvent, such as methanol or ethanol, a surface-active agent, or the like in a proper amount to the alkali developing solution. Water-washing is typically performed after development with the alkali development solution.

Then, as shown in FIG. 4D and step S34 of FIG. 5, the bank 34B is baked into the bank 34, for example, at a temperature of about 200° C. The baking temperature is adjusted depending on the type of the radiation sensitive material 34A. Such baking may not be required. The bank 34 according to the embodiment is formed of a light shielding material, so the bank 34 serves literally as a bank for defining (bounding) the pixel 10 serving as the first color element region and the pixel 20 serving as the second color element region, as well as serves as a light shielding layer for shielding parts other than the pixel 10 and the pixel 20 from light. However, the bank 34 may be formed so as to serve only as a bank. In this case, a light shielding layer consisting of a metal may be formed separately of such a bank.

Then, filter element materials 13R (red), 13G (green), 13B (blue), 13C (cyan), 13M (magenta), and 13Y (yellow), prepared by mixing a coloring agent (pigment, dye, etc.) into a base material such as acrylic resin, are injected into the pixel 10 serving as the first color element region and the pixel 20 serving as the second color element region, defined by the bank 34 formed in the abovementioned manner. For that purpose, a solvent or the like is mixed into the filter element materials 13R (red), 13G (green), 13B (blue), 13C (cyan), 13M (magenta), and 13Y (yellow) to prepare a liquid material N, and then the liquid material N is injected into the pixel 10 and the pixel 20. More specifically, in this embodiment, the liquid material N is injected by letting the liquid material N land in the pixel 10 and the pixel 20 in a form of a droplet L by droplet ejection using a droplet ejection head 52 to be discussed later.

Then, as shown in FIG. 4D and step D35 of FIG. 5, the filter element materials 13R (red), 13G (green), 13B (blue), 13C (cyan), 13M (magenta), and 13Y (yellow) are injected into the pixel 10 and the pixel 20 as the liquid material N (see FIGS. 6A and 6B), and then dried or pre-baked at a low temperature (for example, 60° C.) to be temporarily solidified or hardened. For example, the filter element material 13 R is injected and then pre-baked, as shown in step S36 of FIG. 5, to form a filter element 3R (see FIG. 4E).

Then, as shown in FIG. 4E and step S37 of FIG. 5, the filter element material 13G is injected and then pre-baked, as shown in step S38 of FIG. 5, to form a filter element 3G (see FIG. 4F).

Then, as shown in FIG. 4F and step S39 of FIG. 5, the filter element material 13B is injected and then pre-baked, as shown in step S40 of FIG. 5, to form a filter element 3B (see FIG. 4G).

Then, as shown in FIG. 4G and step S41 of FIG. 5, the filter element material 13C is injected and then pre-baked, as shown in step S42 of FIG. 5, to form a filter element 3C (see FIG. 4H).

Then, as shown in FIG. 4H and step S43 of FIG. 5, the filter element material 13M is injected and then pre-baked, as shown in step S44 of FIG. 5, to form a filter element 3M (see FIG. 4I).

Then, as shown in FIG. 4I and step S45 of FIG. 5, the filter element material 13Y is injected and then pre-baked, as shown in step S46 of FIG. 5, to form a filter element 3Y (see FIG. 4J).

In this way, as shown in FIG. 4J, all the color filter element materials 13R, 13G, 13B, 13C, 13M, and 13Y are injected into the pixel 10 and the pixel 20, and then temporarily solidified or hardened to form filter elements 3R, 3G, 3B, 3C, 3M, and 3Y, which are display elements. Thus, a color filter 38 that includes the filter elements 3R, 3G, 3B, 3C, 3M, and 3Y and serves as a display material is formed.

Then, as shown in step S47 of FIG. 5, the color filter 38 thus formed and serving as a display material is checked. In this check, the abovementioned bank 34 and the filter elements 3R, 3G, 3B, 3C, 3M, and 3Y serving as a display element are observed, for example, by the naked eye or using a microscope or the like. In this case, it is possible to take a picture of the color filter 38 and then to automatically perform checking based on the taken picture. If a flaw is found in the filter elements 3R, 3G, 3B, 3C, 3M, and 3Y serving as a display element in the check, the color filter 38 is eliminated.

Cases in which a flaw is found in the filter elements 3R, 3G, 3B, 3C, 3M, and 3Y includes a case in which any of the filter elements 3R, 3G, 3B, 3C, 3M, and 3Y is missing (so-called "dot dropout"), a case in which, even though the filter elements 3R, 3G, 3B, 3C, 3M, and 3Y are formed, the amount (volume) of the material disposed in the pixel 10 or the pixel 20 is improper—too large or too small, and a case in which, even though the filter elements 3R, 3G, 3B, 3C, 3M, and 3Y are formed, a foreign object such as dust is present in or attached to any of the filter elements.

Then, as shown in step S48 of FIG. 5, when no flaw is found in the check of step 47, baking is performed, for example, at a temperature of about 200° C. to completely solidify or harden the filter elements 3R, 3G, 3B, 3C, 3M, and 3Y on the color filter forming substrate 31. The temperature for the baking can be determined depending on the composition of the filter element materials 13R, 13G, 13B, 13C, 13M, and 13Y, or the like. It is also possible to simply dry or age the filter elements in an atmosphere different from a typical one (for example, in nitrogen gas or drying air) without heating the filter elements to a high temperature.

Hereafter a configuration of a droplet ejection head mounted on the droplet ejection apparatus (not shown) to manufacture the color filter according to the embodiment will be described.

Figure 6A:
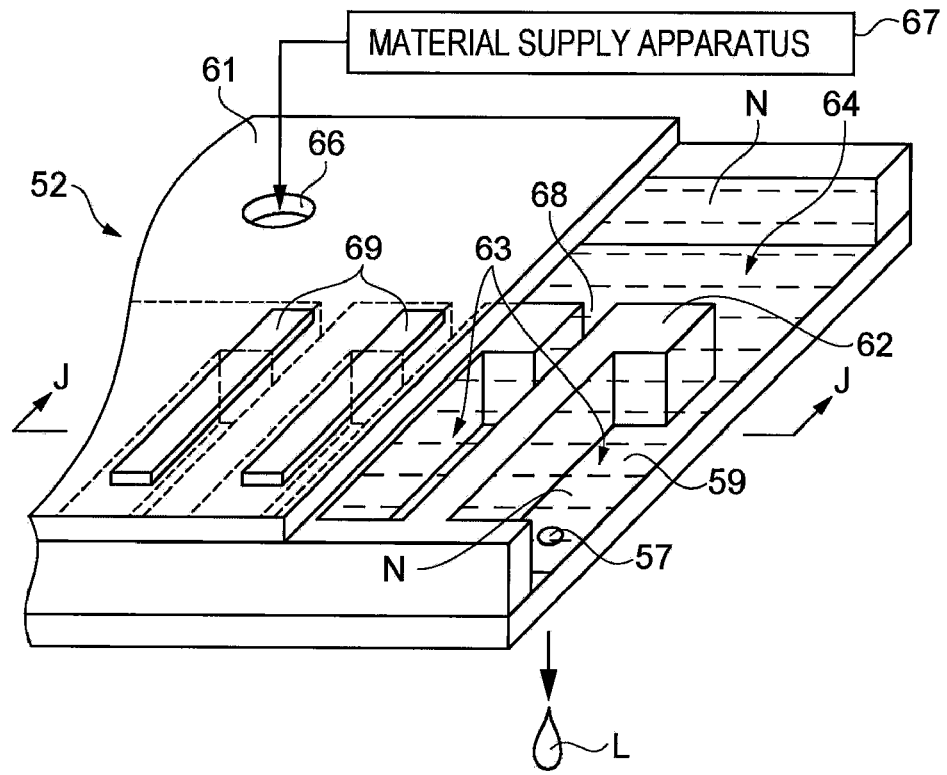
FIGS. 6A and 6B are drawings partially showing a principal part of a droplet ejection head.
Figure 6B:
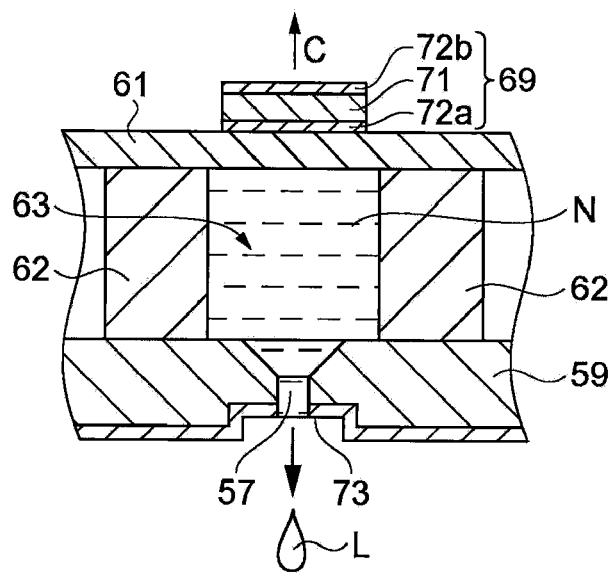

FIGS. 6A and 6B are drawings partially showing a principal part of the droplet ejection head, FIG. 6A is a schematic perspective view, and FIG. 6B is a schematic cross sectional view.

As shown in FIG. 6A, a droplet ejection head 52 includes a nozzle plate 59 that consists of a stainless steel or the like, a diaphragm 61 as opposed to the nozzle plate, and a plurality of dividing members 62 that bond the nozzle plate 59 and the diaphragm 61 together. A plurality of material rooms 63 and a liquid reservoir 64 are formed by dividing the space between the nozzle plate 59 and the diaphragm 61 with the dividing members 62. The material rooms 63 and the liquid reservoir 64 communicate with each other via a passageway 68.

The diaphragm 61 has a material supply hole 66 formed therein. A material supply apparatus 67 is connected to the material supply hole 66. The material supply apparatus 67 supplies a material N, mainly consisting of any one of R, G, B, C, M, and Y, e.g., a filter element material 13R, which has a red color, to the material supply hole 66. The material N thus supplied fills the liquid reservoir 64, then goes through the passageway 68, and then fills the material room 63.

As shown in FIG. 6B, a nozzle 57 for issuing the material N from the material room 63 in a jet is provided in the nozzle plate 59. A material pressuring unit 69 corresponding to the material room 63 is mounted on the back surface of the surface of the diaphragm 61 facing the material room 63. The material pressuring unit 69 includes a piezoelectric element 71 and a pair of electrodes 72a and 72b with the piezoelectric element 71 interposed therebetween. The piezoelectric element 71 is deformed so as to protrude outward as indicated by the arrow C by energizing the electrodes 72a and 72b, thereby increasing the volume of the material room 63. Then, an amount of the material N equivalent to the increased volume flows from the liquid reservoir 64 into the material room 63 via the passageway 68.

Then, stopping energizing the piezoelectric element 71 causes both the piezoelectric element 71 and the diaphragm 61 to restore their original shape. As a result, the material room 63 also restores its original volume, the pressure on material N inside the material room 63 is increased, and the material N is ejected as a droplet L from the nozzle 57. To prevent flight-bending of the droplet L and hole-clogging of the nozzle 57, a liquid-repellent material layer 73, for example, consisting of an Ni-tetrafluoroethylene eutectoid plated layer, is provided in the vicinity of the nozzle 57.

Now a method for manufacturing the LCD according to the embodiment will be described.

Figure 7:
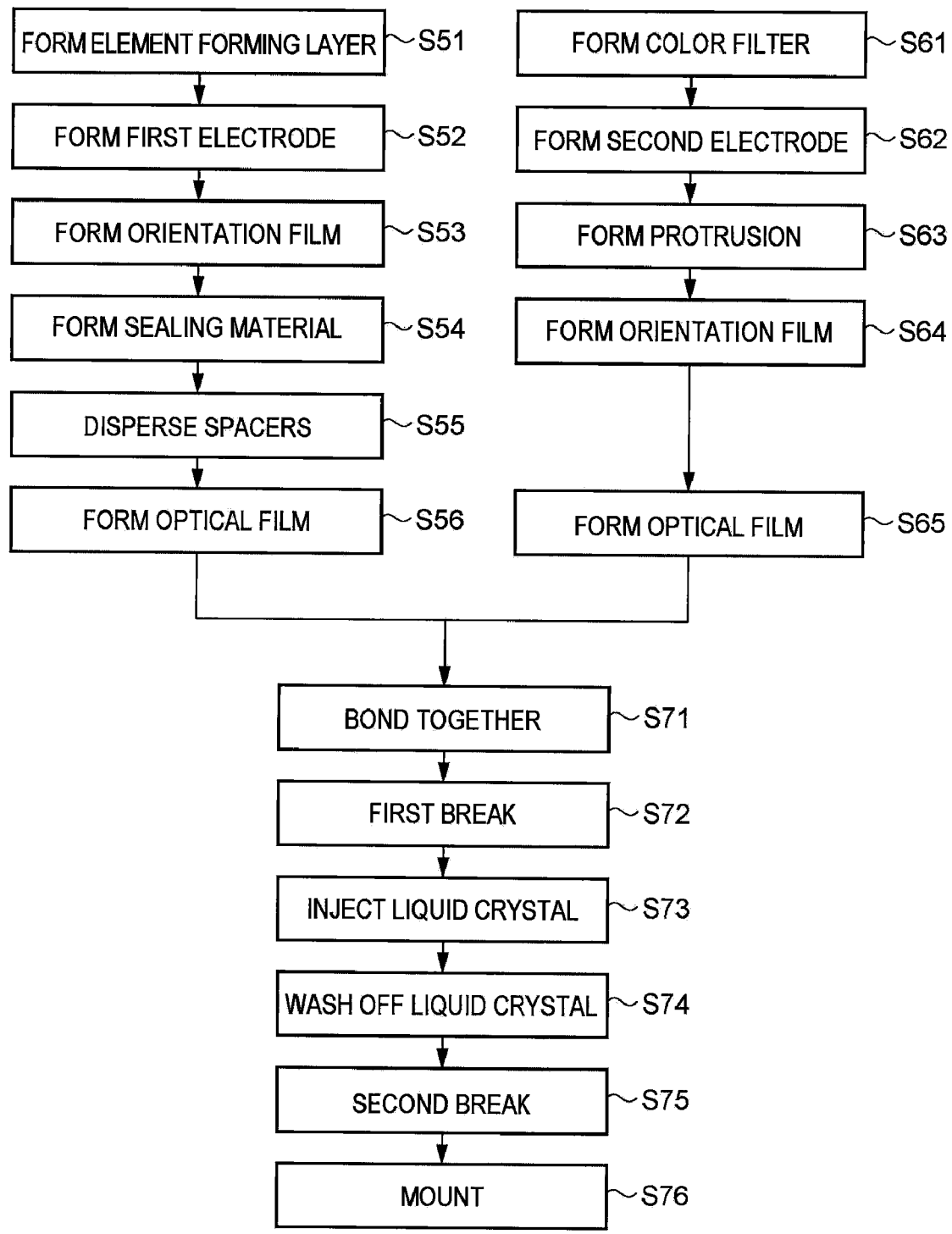
FIG. 7 is a schematic flowchart showing manufacturing steps of the LCD.
Figure 8A:
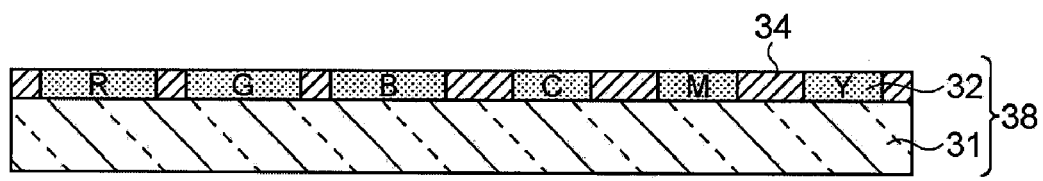
FIGS. 8A and 8D are cross sectional views of the manufacturing steps of the LCD.

FIG. 7 is a schematic flowchart showing manufacturing steps of the LCD according to the embodiment. FIGS. 8A and 8D are cross sectional views of the manufacturing steps of the LCD.

The LCD 100 is manufactured, for example, by conducting the manufacturing steps as shown in FIG. 7. In the manufacturing steps, a series of steps S51 to 56 are steps for forming the element substrate 29 serving as the first substrate, and a series of steps S61 to S65 are steps for forming the color filter substrate 39 serving as the second substrate. In general, the steps for forming the element substrate 29 and the steps for forming the color filter substrate 39 are conducted separately. Subsequently, the element substrate 29 and the color filter substrate 39 are bonded together to form the LCD 100.

In the steps for forming the element substrate 29 serving as the first substrate, the element forming layer 23 (see FIG. 2B) is initially formed on the element forming substrate 21 (see FIG. 2B) consisting of a material such as transparent glass or transparent plastic, as shown in step S51 of FIG. 7. Photolithography or the like may preferably be used to form the element forming layer 23. It is more preferable to form an insulating film on the element forming layer 23 using a known film forming method.

Then, as shown in step S52 of FIG. 7, the pixel electrode 3 (see FIG. 2B) serving as the first electrode is formed. Photolithography or the like may preferably be used to form the pixel electrode 3.

Then, as shown in step S53 of FIG. 7, an orientation film (not shown) having a vertical orientation function is formed on the pixel electrode 3 (see FIG. 2B). Coating, printing, or the like may be used to form the orientation film.

Then, as shown in step S54 of FIG. 7, a sealing material (not shown) is formed in an annular shape. The sealing material may be formed by letting an epoxy resin adhere to the inner face of the element substrate 29 or the color filter substrate 39 in an annular (in an orbiting manner), for example, by screen printing. A conduction material (not shown) formed in a spherical or cylindrical shape with a conductive material is contained in a dispersion state in the sealing material (not shown).

Then, as shown in step S55 of FIG. 7, spacers (not shown) are dispersed. The spacer has a spherical shape. The liquid crystal 24 is sealed in a gap among the element substrate 29, the color filter substrate 39, and the sealing material (not shown), a so-called "cell gap." Many minute spacers (not shown) having a spherical shape are dispersed on the inner surfaces of the element substrate 29 and the color filter substrate 39. The presence of these spacers (not shown) in the cell gap allows the cell gap to be maintained uniformly.

Then, as shown in step S56 of FIG. 7, the optical film 22 (see FIG. 2B) is formed on the opposite surface to the surface of the element forming substrate 21 on which the pixel electrode 3 is formed. Thus, the element substrate 29 is formed.

In the steps for forming the color filter substrate 39 serving as the second substrate, the color filter layer 32 (see FIG. 2B) is formed on the color filter forming substrate 31 (see FIG. 2B) consisting of a material such as transparent glass or transparent plastic, as shown in step S61 of FIG. 7 and FIG. 8A. Photolithography or the like may preferably be used to form the color filter layer 32 (see FIG. 5). It is more preferable to form an insulating film on the color filter layer 32 using a known film forming method.

Figure 8B:
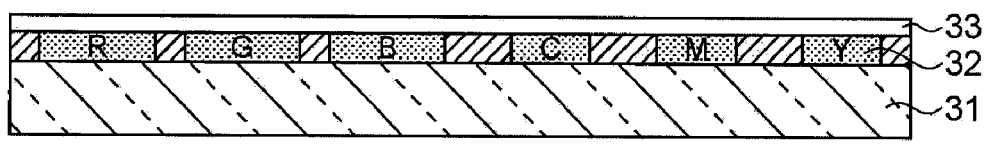

Then, as shown in step S62 of FIG. 7 and FIG. 8B, the opposed electrode 33 serving as the second electrode is formed. The opposed electrode 33 is transparent and formed on the filter elements 3R, 3G, 3B, 3C, 3M, and 3Y. The opposed electrode 33 is formed of a transparent conductive material having a conductive function, such as indium tin oxide (ITO). Therefore, light is apt to be transmitted through the opposed electrode 33. Photolithography is used to form the pixel electrode 3.

Figure 8C:
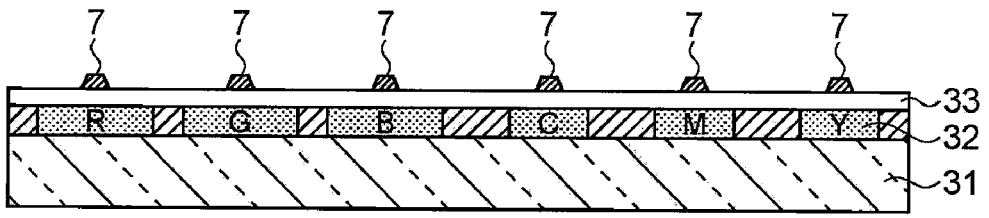
Figure 8D:
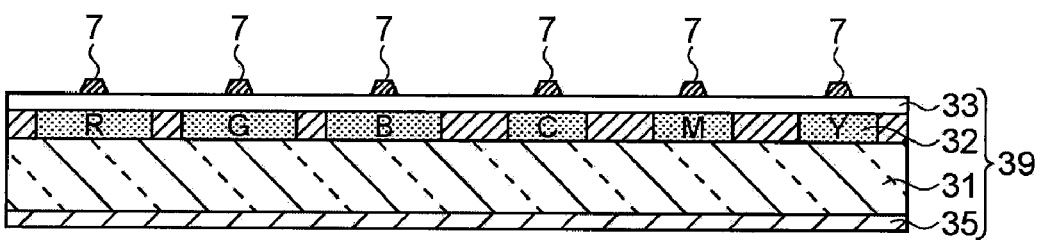

Then, as shown in step S63 of FIG. 7 and FIG. 8C, the rib 7 serving as a protrusion is formed on the opposed electrode 33. The rib 7 is disposed on the filter elements 3R, 3G, 3B, 3C, 3M, and 3Y. A known photolithography is used to form the rib 7. For example, a photomask (not shown) is disposed on the color filter substrate 38 to form the rib 7 on the filter elements 3R, 3G, 3B, 3C, 3M, and 3Y. The rib 7 has a height h.

Then, as shown in step S64 of FIG. 7, an orientation film (not shown) that consists of polyimide or the like and has a vertical orientation function is formed on the opposed electrode 33.

Then, as shown in step S65 of FIG. 7 and FIG. 8D, the optical film 35 having a polarizing function is formed on the back surface of the color film forming substrate 31 (the opposite surface to the surface on which the color filter is formed).

Thus, the color filter substrate 39 including the filter elements 3R, 3G, 3B, 3C, 3M, and 3Y is formed. The color filter substrate 39 includes the first light shield E1 and the second light shield E2. The width D2 of the second light shield E2 is larger than the width D 1 of the first light shield E1.

Then, as shown in step S71 of FIG. 7, the element substrate 29 and the color filter substrate 39 are aligned and then bonded together. Thus, a blank panel structure (not shown) that includes panel portions of a plurality of liquid crystal panels and in which the liquid crystal 24 is not sealed yet is formed.

Then, as shown in step S72 of FIG. 7, by forming a scribe groove, i.e., a severing groove, at a prescribed position of the completed panel structure (not shown), applying stress or heat or light to the panel structure with reference to the scribe groove or adopting other methods, and thus breaking the substrates, the panel structure is severed (first break). Thus, strip-shaped blank panel structures (not shown) are formed.

Then, as shown in step S73 of FIG. 7, the liquid crystal 24 is injected into each strip-shaped panel structure. The injection of the liquid crystal 24 is conducted, for example, by pooling the liquid crystal 24 in a reservoir, putting both the reservoir containing the liquid crystal 24 and the strip-shaped blank panel into a chamber or the like, putting the chamber or the like in a vacuum, and immersing the strip-shaped blank panel (not shown) in the liquid crystal 24 inside the chamber. Thereafter, when putting the chamber under atmospheric pressure, the liquid crystal 24, to which atmospheric pressure is being applied, is injected into the panel via an opening for injecting a liquid crystal (not shown). This is because the inside of the strip-shaped blank panel (not shown) is maintained under vacuum.

Then, as shown in step S74 of FIG. 7, the strip-shaped panel structure (not shown) already subjected to liquid crystal injection is washed. This is because the liquid crystal 24 may adhere to around the panel structure (not shown).

Then, as shown in step S75 of FIG. 7, a scribe groove is again formed at a prescribed position of the strip-shaped panel (not shown) already subjected to liquid crystal injection and washing. Subsequently, the strip-shaped panel (not shown) is severed with reference to the scribe groove (second break). Thus, a plurality of liquid crystal panels (not shown) are cut from the strip-shaped panel.

Finally, as shown in step S76 of FIG. 7, an IC for driving a liquid crystal (not shown) and a backlight (not shown) serving as a lighting apparatus are mounted on each of the liquid crystal panels thus manufactured. Further, a flexible printed circuit (FPC) is connected to each liquid crystal panel. Thus, the intended LCD 100 is completed. The IC for driving a liquid crystal, the backlight, the FPC, or the like are not shown in FIG. 1 and FIGS. 2A and 2B showing the LCD 100.

The structure of the LCD 100 and the method for manufacturing the same according to the embodiment have heretofore been described. Now description will be made on visibility in a case in which the light shield E is disposed such that the width D of the light shield E varies depending on the color element region 1, referring to FIGS. 3A and 3B.

As shown in FIGS. 3A and 3B, the pixel 10 and the pixel 20 are formed in the color element region 1. The light shield E1 is formed so as to extend in a column direction (Y direction) of the pixel 10, and similarly the light shield E2 is formed so as to extend in a column direction (Y direction) of the pixel 20. In this case, the second light shield E2 formed around the pixel 20 is formed so as to be wider in a row direction (X direction) than the first light shield E1 formed around the pixel 10 (width D2 of the second light shield E2>width D1 of the first light shield E1). Consequently, when light, which has been transmitted through the liquid crystal, is transmitted through the pixel 20, the light less likely affects the pixel 10. This makes it possible to suppress reduction of the contrast. Therefore, in the LCD 100, it is possible to improve visibility while maintaining the color reproducibility.

More specifically, it is possible to obtain good visibility for humans while maintaining the color reproducibility of the six color elements R, G, B, M, Y, and C. Therefore, it is possible to provide the LCD 100 capable of improving display performance.

The abovementioned embodiment has the following advantages.

(1) The width D of the light shield E is formed so as to vary depending on the color element region 1. This makes it possible to adjust the intensity of light in a good balance when the light is transmitted through the light crystal 24, and thus to improve the color balance for each of the color element regions 1. As a result, it is possible to provide the LCD 100 with excellent visibility.

(2) The width D2 of the second light shield E2 is made larger than the width D1 of the first light shield E1, so the pixel 20 serving as the second color element region becomes smaller than the pixel 10 serving as the first color element region. Consequently, when light, which has been transmitted through the liquid crystal 24, is transmitted through the pixel 20, the light less likely affects the pixel 10, thus allowing a reduction in contrast to be suppressed. Therefore, it is possible to provide the LCD 100 that can offer excellent visibility as well as good display performance while maintaining the color reproducibility.

Figure 9:
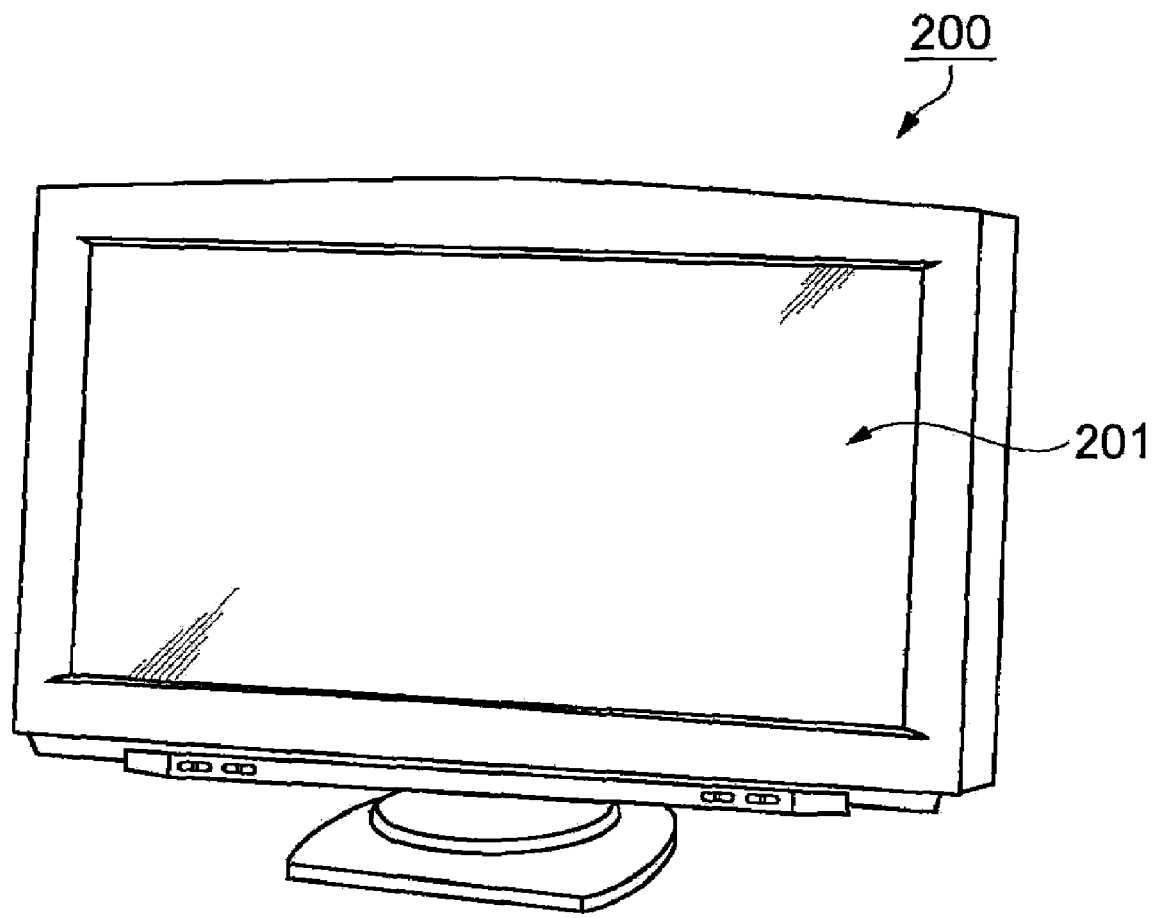
FIG. 9 is a schematic perspective view showing a large-scale TV serving as an electronic apparatus.

FIG. 9 is a drawing showing an electronic apparatus according to the embodiment.

As shown in FIG. 9, a large-scale liquid crystal TV 200, serving as an electronic apparatus according to the embodiment, has the LCD 100 described in the embodiment mounted thereon as a display 201. In other words, the large-scale liquid crystal 200 serving as an electronic apparatus according to the embodiment includes the LCD 100 with improved color balance and excellent visibility. Therefore, it is possible to provide the large-scale liquid crystal TV 200 serving as an electronic apparatus with excellent display characteristics.

While the preferred embodiment of the invention has heretofore been described, the invention is not limited to the embodiment. The invention also includes modifications as shown below, and can be applied to any other specific structure and form without departing from the scope of the invention.

Modification 1

In the abovementioned embodiment, the six color elements R, G, B, C, M, and Y (R: red, G: green, B: blue, C: cyan, M: magenta, Y: yellow) are disposed in the pixel 10 and the pixel 20. However, the invention is not limited to such color element disposition. For example, four color elements R, G, B, and W (R: red, G: green, B: blue, W: white) may be disposed in the pixel 10. Even when such color element disposition is adopted, it is possible to obtain a similar advantage to that of the embodiment. This is because the width D2 of the second light shield E2 is larger than the width D 1 of the first light shield E1.

Modification 2

In the abovementioned embodiment, the structure of the VA type LCD 100 is shown. However, the invention is not limited to the VA type LCD. For example, the invention can also be applied to IPS type LCDs. Thus, a variety of the LCD 100 can be provided.

Modification 3

In the abovementioned embodiment, the LCD 100 is mounted on the large-scale TV 200. The electronic apparatus according to the invention is not limited to large-scale TVs. The LCD 100 may preferably be used, for example, as display means of portable information devices called PDA (Personal Digital Assistants), portable terminals, personal computers, word processors, digital still cameras, monitors for automobile use, direct view type digital video recorders, car navigation systems, electronic notepads, workstations, picture-phones, point-of-sale terminals, and the like. As a result, it is possible to expand applications of the LCD 100 and thus to provide a variety of electronic devices.

The entire disclosure of Japanese Patent Application No. 2006-42006, filed Feb. 20, 2006 is expressly incorporated by reference herein.

What is claimed is:

1. A liquid crystal display, comprising:
a first substrate;
a second substrate disposed in a position opposite to the first substrate;
a liquid crystal interposed between the first and second substrates;
a plurality of first color element regions provided on the second substrate and arranged in a row direction, the plurality of first color element regions having a plurality of first colors:

a plurality of second color element regions provided on the second substrate and arranged in the row direction, the plurality of second color element regions having a plurality of second colors different than the first colors, the plurality of second color element regions disposed adjacent the plurality of first color element regions in a column direction perpendicular to the row direction;

a plurality of first light shields formed so as to surround the first color element regions; and a plurality of second light shields formed so as to surround the second color element regions, wherein a first width of the first light shields between the first color element regions in the row direction is different than a second width of the second light shields between the second color element regions in the row direction.

2. The liquid crystal display according to claim 1, wherein the second color element regions have a smaller area than that of the first color element regions, and the second width of the second light shields is larger than the first width of the first light shields.

3. An electronic apparatus having a liquid crystal display, comprising:

the liquid crystal display according to claim 1.

4. The liquid crystal display according to claim 1, wherein the plurality of first colors includes a red color, a green color, and a blue color, and the plurality of second colors includes a cyan color, a magenta color, and a yellow color.

5. The liquid crystal display according to claim 1, wherein the second colors are complementary colors to the first colors.

* * * * *